United States Patent [19]

Crane et al.

[11] 4,040,011
[45] Aug. 2, 1977

[54] IDENTIFICATION BASED ON HANDWRITING SAMPLES

[75] Inventors: Hewitt D. Crane, Portola Valley; Earle D. Jones, Menlo Park, both of Calif.

[73] Assignee: Stanford Research Institute, Menlo Park, Calif.

[21] Appl. No.: 716,270

[22] Filed: Aug. 20, 1976

[51] Int. Cl.² .............................................. G06K 9/00
[52] U.S. Cl. .................. 340/146.3 SY; 340/146.3 AQ
[58] Field of Search ............ 340/146.3 AQ, 146.3 SY, 340/146.3 MA, 146.3 AC

[56] References Cited

U.S. PATENT DOCUMENTS

| 3,182,290 | 5/1965 | Rabinow | 340/146.3 AQ |
| 3,618,019 | 11/1971 | Nemirovsky et al. | 340/146.3 SY |
| 3,675,203 | 7/1972 | Baumann | 340/146.3 AQ |
| 3,829,831 | 8/1974 | Yamamoto et al. | 340/146.3 AQ |

OTHER PUBLICATIONS

Tou et al., "Recognition of Handwritten Characters . . .," *IEEE Trans. on Computers,* July 1972, pp. 776-785.
Cutaia, "Multilevel Character Recognition System," *IBM Tech. Disclosure Bulletin,* vol. 13, No. 12, May 1971, pp. 3739-3742.

*Primary Examiner*—Leo H. Boudreau
*Attorney, Agent, or Firm*—Lindenberg, Freilich

[57] ABSTRACT

An individual, who is to be subsequently identified, first signs his signature, hereinafter called a template signature, with a special pen, attached to circuits, which produce digital sample signals from which a set of parameters of his signature are derived. This set of template signature parameters is stored in a memory along with sets of parameters derived from template signatures of other individuals. Subsequently, when an individual signs his name with a special pen, the circuits will produce a set of parameters, corresponding to those produced for a template signature. Parameters are selected which can provide strong distinction between signatures. The selected parameters are then used to derive from memory only those sets of template parameters which include the selected parameters which have values falling within a predetermined acceptable range of values. These sets of template parameters are then compared by parameter methods (or, by correlation methods, if the raw signals are available) with the specimen set of parameters to determine the best comparison and thereby provide signature and individual identification.

9 Claims, 3 Drawing Figures

IDENTIFICATION BASED ON HANDWRITING SAMPLES

BACKGROUND OF THE INVENTION

It is known to verify the signature of a person by comparing that signature with a previously produced and stored template signature of that person. This is usually done by providing the person, whose signature is to be verified, the address in memory wherein the template data set, representing the template signature, is stored. The address may be memorized and entered via a keyboard into a computer system including the memory, or it may be stored on a card which is read. The template data set, which is read out, is then compared in some manner with a specimen data set derived from the person's signature for verification.

It would be exceedingly useful if some way could be found whereby the signature of a person or even more broadly, a specimen of the handwriting of a person, not necessarily his name, could be used not only to verify such handwriting but also to identify that person. Hereafter, the word signature should be taken to mean a specimen of handwriting constituting a predetermined set of words, or a word, or a symbol, and may also include a person's name.

OBJECTS AND SUMMARY OF THE INVENTION

An object of this invention is to provide a method and means of identifying a person from his signature.

Still another object of this invention is the provision of a method and means of using predetermined parameters derived from a specimen signature, for deriving sets of template parameters including the predetermined parameters, from a memory storing a plurality of sets of template parameters derived from template signatures.

Yet another object of this invention is the provision of a novel and useful method and means for achieving both signature verification and individual identification using the person's signature.

The foregoing and other objects of the invention may be achieved by storing in a memory distinctive data sets, such as parameters sets, each set derived from a template signature, which uniquely identifies that signature. When a specimen signature is written, parameters which provide a strong distinction between signatures are selected. An acceptable range of the values of these parameters is established. The contents of the memory are then read out and the range of values for the selected specimen parameters are compared with similar parameters in the template parameter sets. Those template parameter sets containing parameter values which fall within the range are then compared with the specimen parameter set. The best comparison provides an identification of the individual who provided the specimen signature.

In an application for patent, Ser. No. 629,290, entitled Identification By Handwriting Verification, by Hewitt Crane et al., which is assigned to a common assignee, there is shown and described a system for deriving and comparing the parameters of template and specimen signatures.

By way of example, one parameter that may be used may be the number of times a person lifts his pen from the paper in writing his signature. This is called "pen ups". A second parameter may be signature duration. Others may be number of zero crossings, etc.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
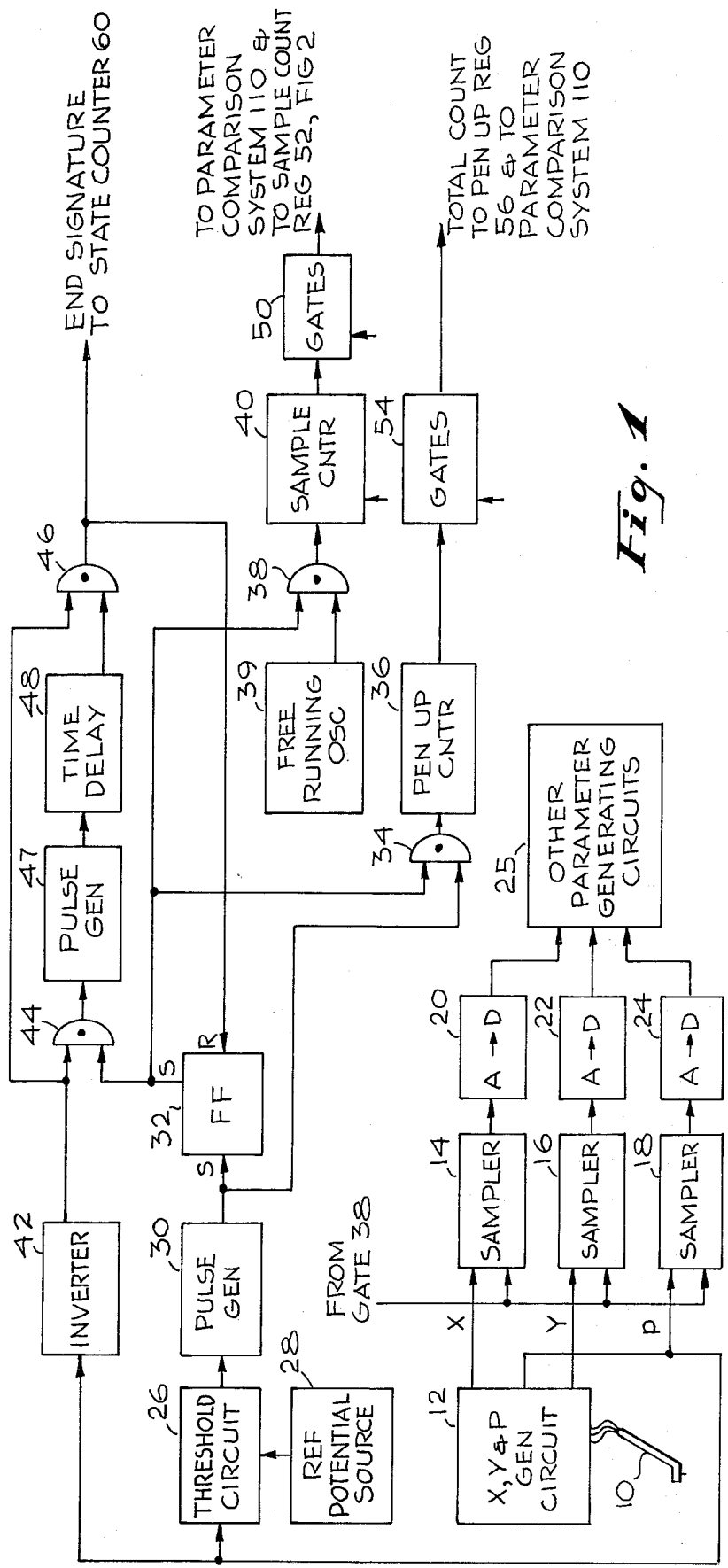
FIG. 1 is a block schematic diagram of a circuit arrangement for generating parameter signals from a signature.

FIG. 1 is a block schematic diagram illustrative of how the P, X and Y force signals may be generated in writing with a pen for both template and specimen signatures, and how for example, signature duration as one parameter, may be measured and how the pen-ups, as a second parameter, are detected and counted. A pen, of the type suitable for use with this invention together with the necessary associated circuitry which will generate the X, Y and P signals are described and claimed in U.S. Pat. No. 3,915,015. A pen 10, and signal generating circuit 12, which is associated therewith, produce X, Y and P signals, which are respectively representative of the direction forces and pressure. These are analog signals which are respectively applied to three sampler circuits, respectively 14, 16 and 18. These sampler circuits, are periodically enabled to sample the signals applied to their inputs in response to pulses received from a free-running oscillator, as will be subsequently described. The sample signals, which constitute the outputs of the respective sampler circuits 14, 16 and 18 are respectively applied to analog to digital converting circuits 20, 22 and 24 (A/D) to provide digitized samples. The outputs of the three A/D circuits are transferred to "other parameter generating circuits" 25 wich convert the force signals into other parameter values. This may be done for example in the manner shown and described in a patent application by Crane et al. filed Nov. 6, 1975, bearing Ser. No. 629,290 and entitled "Identification by Handwriting Verification", and assigned to a common assignee.

The pressure signal provided by the generating circuit 12, is also applied to a threshold circuit 26. The threshold circuit measures the amplitude of the P signal against a pre-established reference potential, provided from a reference potential source 28. If the pressure signal exceeds the reference potential signal, the threshold circuit 26 applies an output to a threshold pulse generator 30, which produces a single pulse in response thereto. The pulse generator output sets a flip flop 32 and is also applied to a gate 34, which receives enabling input from the set output of the flip flop 32. The output of the gate 34 is applied to a pen-up counter 36.

As will be subsequently described, flip flop 32 remains set until the end of the signature. Each time the pen 10 is lifted from the paper and, within a perdetermined interval, the pen is again applied to the paper, pulse generator 30 will provide an additional pulse. Thus, by counting the number of pulse outputs from pulse generator 30 during a signature, one can determine how many times the pen was lifted during the signature. Accordingly, the pen-up counter 36 at the end of the signature will contain a total count equal to the number of pen-ups that occur during the signature. This is one parameter.

The set output of flip flop 32 also enables a gate 38. The output of a free-running oscillator 39, can then be applied by the gate 38 to a sample counter 40, and also to the sampling circuits 14, 16, and 18, whereby they can sample the respective X, Y and P input signals.

The P output of the X, Y and P generating circuit 12 is also applied to an inverter 42, the output from which is applied to two And gates, respectively 44 and 46. Gate 44 is enabled when flip flop 32 is transferred to its set condition. Accordingly, when this occurs the output of the inverter 42, in response to a P signal, is applied to a pulse generator 47. The pulse generator 47 generates a pulse which is applied to a time delay circuit 48. Should an enabling output from the inverter 42 still be present at the end of the delay, provided by time delay circuit 48, And gate 46 provides an output which can be considered as an "end of signature" output. This is used to reset the flip flop 32. The time delay 48 establishes an interval between its input and output sufficiently long so that pen-ups required for going from one word or one character to another or for crossing $t$'s or dotting $i$'s will transpire before that interval. Only when the pen has been lifted for a sufficient time to indicate that the signature has been terminated is an output received from the time delay circuit 48.

It should be noted that the inverter 42 will provide an output each time the pen is lifted from the paper whereby gates 44 and 46 will have a signal applied thereto. In the presence of an output from And gate 46, flip flop 32 is reset whereby And gates 34 and 38 are no longer enabled.

Figure 2:
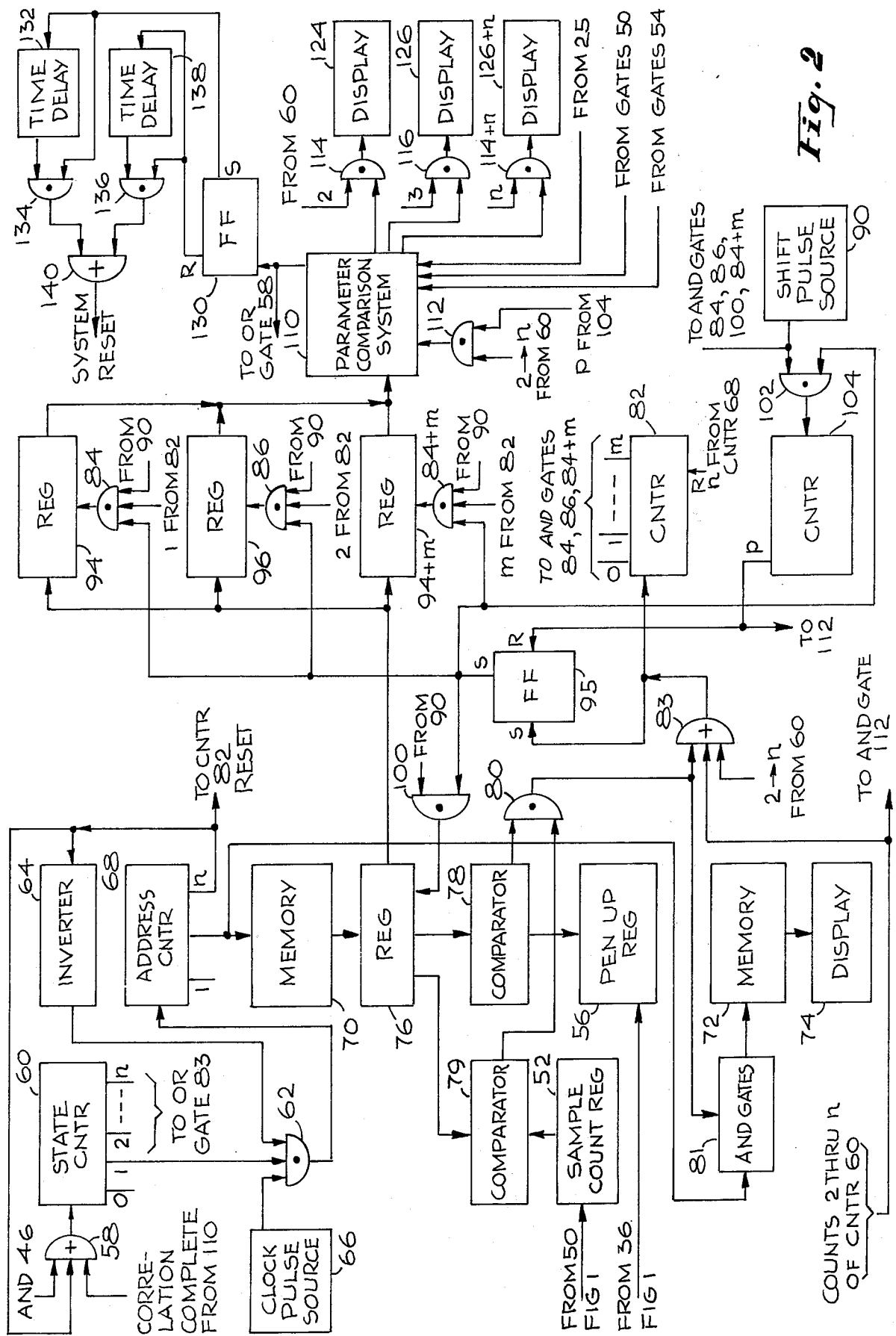
FIG. 2 is a block schematic diagram illustrating the addressing of a memory using one of the parameter signals generated by the circuit arrangement shown in FIG. 1.

The outputs of the sample counter 40 is applied to a set of gates 50, which are enabled to transfer the total count of the sample counter, in response to an output from And gate 46, to a sample counter register 52, shown in FIG. 2. The sample count indicates the time required for writing the signature. This may be considered as another parameter. The total count of the pen-up counter 36 is also applied to a set of gates 54, to enable them to transfer the total count to a pen-up register 56, shown in FIG. 2.

Referring now to FIG. 2, the output of the And gate 46 and the end of the signature signal are applied to an Or gate 58. The output of the Or gate is applied to a state counter 60, enabling it to go from a zero to its one count state. The one count state of the state counter is applied to an And gate 62. The enabling input to the And gate 62 is the output of an inverter 64, which, in the absence of an input, enables the And gate 62, to apply pulses from a clock source 66, to an address counter 68. The inverter 64 is connected to receive the last or $n$th count of the counter 68, so that when that count is reached, which occurs when the last storage location in a memory 70 has been read out, the inverter receives a signal, whereby no more clock pulses can pass through And gate 62 and the address counter 68 no longer addresses the memory 70.

The memory 70 stores parameter information or a set of parameters for a plurality of template signatures. This parameter data is the output of the circuits such as "other" parameter generating circuits 25, pen-ups from the pen-up counter 36, as well as sample counts from sample counter 40. This data is stored at a plurality of locations in memory 70 which can be addressed by address counter 68.

Either part of the same memory, or a supplemental memory 72, may be used for storing, at locations corresponding to those in memory 70, data which when read out is displayed by a display device 74. This display is in human readable form and enables identification of the template parameters sets selected for comparison with the specimen parameter set, from which, as will be shown, identification of the person who provided the specimen signature can be made.

The memory 70, in response to being addressed by the address counter 68, transfers the parameter set at the addressed location into a register 76. So much of the register as contains the parameters, which are to be compared with the specimen parameters are applied to comparator circuits 78 and 79, to be respectively compared with the pen-up parameter which is in the pen up register 56 and the sample count parameter in the sample count register 52.

The comparators 78 and 79 do not look for identical comparisons between its two inputs, but rather look for previously determined ranges. This is to take care of the situation that a person does not necessarily sign each signature identically.

An And gate 80 is enabled to produce an output only when both comparators 78 and 79 produce outputs. The same address which is applied by address counter 68 to the memory 70, is also applied to And gates 81. Whenever the And gate 80 produces an output indicative that the parameters in register 76 are within the predetermined ranges, it enables And gates 81 to apply the address in the address counter 68 to the memory 72. This address locates the data which can be visually displayed by display 74 or printed out in the same order as received. This display provides the information either identifying or enabling the identification of the person whose template parameter sets have been selected by the comparators for parameter comparison.

The output of the And gate 80 is also applied through an Or gate 83 to advance a counter 82. This counter sequentially applies its counts to a plurality of And gates respectively 84, 86 and 84+$m$. Another required enabling input to these And gates is the set output of a flip flop 95. As each of these And gates is enabled in sequence, it can apply shift pulses from a shift pulse source 90, to the respective shift registers, respectively 94, 96, 94+$m$. The output of Or gate 83 is also used to set the flip flop 95. The set output of this flip flop also enables two And gates 100 and 102. When enabled, And gate 100 applies shift pulses to the register 76 whereby its contents may be transferred out into one of the register 94, 96, 94+$m$.

And gate 102 enables shift pulses from source 90 to be applied to a counter 104. This counter has a count capacity equal to the storage capacity of any one of the registers 76 and/or 94, 96, 94+$m$. It counts the number of shift pulses which are applied to the register transferring or receiving the parameter data. When the counter 104 reaches its last or $p$ count this output is used to reset flip flop 95, whereby shift pulses are no longer applied to any of the registers 94, 96, 94+$m$ or to register 76.

As previously described, the last output, $n$, of the address counter 68 discontinues further addressing of the memories 70 and 72, and also advances the state counter 60 to its second count. The $n$th or last output of the address counter 68, also resets counter 82.

Each count from the second to the nth count, of the state counter 60 is applied through Or gate 83 to set flip flop 95 and also to advance the count of counter 82. The set output of flip flop 95 together with the one count output from counter 82 enable And gate 84 to apply the shift pulses applied to its input from shift pulse source 90 to register 94 to shift its contents out and into a comparison system 110. The comparison system can be any known system for comparing the parameter signals of a template signature with those of a specimen signature. The specimen signature parameters are applied to a parameter comparison system 110 from the parameter generating circuits 25, shown in FIG. 1 as well as from sample count register 52 and pen up register 56.

Counter 104 again is enabled to count the shift pulses applied to register 94 by the set output of flip flop 95. Counter 104 will reset the flip flop 95 when it reaches its $p$ count, which occurs when the full content of the register 94 has been transferred out to the parameter comparison system 110. The system 110 is enabled to commence the operation of comparing parameters in response to an output from And gate 112. This And gate applies an enabling input to the system 110 in response to the counts 2 through $n$ from the state counter 60 together with a $p$ count from counter 104.

The parameter comparison system may be of the type described and shown in the previously mentioned application Ser. No. 629,290.

Each time the system 110 completes a comparison, it provides an output signal indicative of this to the Or gate 58 to advance the state counter 60 to its next count state. This will cause a transfer into the comparison system of the contents of the next one of the registers 94, 96, 94+$n$. This continues until the contents of each register has been successively transferred out and compared with the specimen parameter set. The results of each successive comparison are applied through the successive And gates 114, 116, 114+$n$ which are successively enabled by 2, 3-$n$ counts of counter 60 to the respective displays 124, 126, 124+$n$. The highest or best comparison result which is displayed, may be specifically identified by comparing that display with the ones shown in the display 74. Thus, if for example, the second signature which has been selected by the comparator produces the best comparison result this best result will be displayed in the second display 126. The display 74 will have the person identifying data displayed in the same order as they are shown in the displays 124, 126 and 124+$n$. Thereby the identification of the indiviudal who has signed the specimen signature is produced and confirmed.

In order to determine when the comparison system has completed the parameter comparison operation with all of the template signatures which have been read out of memory the output from the comparison system 110 indicating the end of a comparison is also applied to a flip flop 130 to drive it successively from its set to its reset state. The set output of this flip flop is applied to a time delay circuit 132 and to an And gate 134. The time delay circuit 132 output is also applied to the And gate 134. The reset output of flip flop 130 is applied to an And gate 136 and to a time delay circuit 138. The output of this time delay circuit 138 is also applied to And gate 136. The outputs of And gates 134 and 136 are applied to an Or gate 140 whose output is the system reset signal.

The delay established by each of the two time delay circuits is slightly longer than the time required for comparison system 110 to receive a set of template parameters and perform a comparison. Accordingly, assuming that an output from the comparison system 110 drives flip flop 130 to its set state, it the flip flop is not driven to its reset state by the time time delay 132 applies its output to And gate 134, the And gate will pass this output to Or gate 140 and the system will be reset.

However, should an output from the comparison system 110 occur prior to the output of time delay 132 then no system reset will occur. Another output must be received from comparison system 110 to drive flip flop 130 back to its set state before an output occurs from time delay 138, otherwise a system reset will occur.

In the manner described, the end of the comparison activity for all of the template parameter sets is detected.

The system described may be used for correlation of template and specimen signature signals, if along with parameter signal storage, provision were made to store the analog signals which are generated in writing the template and specimen signatures so that when comparators 78 and 79 indicate an acceptance the analog signals of the template signature read out at that time can be compared with the specimen analog signals. Alternative to storing analog signals digital signals which are samples of the analog signals may be stored and used for correlation purposes in a manner shown and described in an application Ser. No. 629,290.

Figure 3:
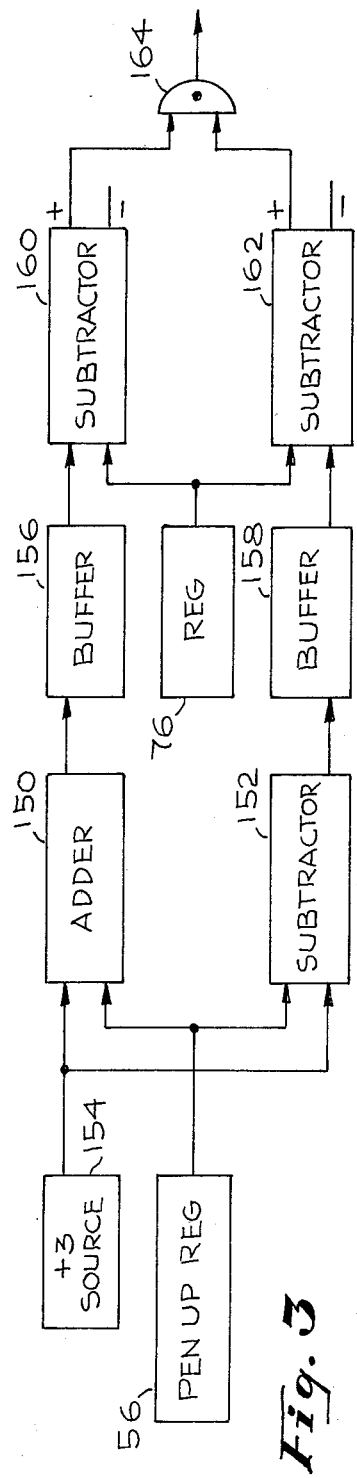
FIG. 3 is a block schematic diagram illustrating a comparator arrangement suitable for use in a memory search.

FIG. 3 illustrates a schematic block diagram of a suitable comparator arrangement for comparators 78 and 79. Using comparator 78 for illustrative purposes, the contents of pen-up register 56 are applied to an adder circuit 150, and to a subtractor circuit 152. The second input to adder circuit 150 is a digital number which when added to the number of pen-ups sets the upper limit of the range to be selected from the memory contents. By way of example, this is indicated as a +3 source 154. The second input to the subtractor 152 is a digital value such as that from the +3 source 154, which is subtracted from the number of pen-ups, to establish the lower limit of the range. The outputs from the respective adder and subtractor circuits are respectively transferred into buffer circuits 156, 158.

Buffer circuit 156 applies its output to subtractor circuit 160. Subtracted therefrom are the pen-up contents of register 76. The digital number in buffer 158 is applied to subtractor circuit 162, to be subtracted from the number of pen-ups in register 76. Should the output of subtractor circuit 160 be positive it indicates that the number of pen-ups in register 76 is less than the top of the range, then a positive output is obtained from subtractor 160. Should the number of pen-ups in the register 76 be greater than the number of pen-ups indicated by the output of buffer 158, then the output of subtractor circuit 162 is positive. Accordingly, positive outputs from both subtractor circuits respectively 160, 162, are indicative of the fact that the number of pen-ups indicated by the contents of register 76 fall within the predetermined range of pen-ups. The two positive outputs from subtractor circuits 160 and 162 are applied to an And gate 164 whereby it can produce an output indicative of the fact that the parameters which have been read out of the memory 70 into the registers 76 should be transferred into one of the registers 94, 96 or 94+$n$.

While the foregoing description has used the pen-ups and duration parameters for determining which of the stored template parameters should be used for the comparing process with a specimen, it will be appreciated that this is by way of example, and it should not be held to be a limitation upon the invention. Other parameters may be selected and several may be used for further reducing the number of template parameter sets used for final comparison. Those parameters which are selected should be those which provide "strong" separation characteristics between signatures.

Other samples of variables, which can be used are the ratio of pen-up to pen-down time, the maximum X signal divided by the maximum Y signal, etc. Each one of these is used to define the center of an assignable detection range.

If desired the template parameter sets may be arranged to be stored in a memory in a manner so that template parameter sets including predetermined ranges of the parameters used for selecting template parameter sets from memory are grouped to be called out by a single address. This address is generated from the specimen parameter value. This method of storage can save search time but increases the hardware required.

Further, while the embodiment of the invention has been described using parameter sets of digital data, other parameters, which are known in the art and are used for uniquely identifying a signature may be used in the manner described herein without departing from the scope and spirit of the claims.

There has accordingly been described and shown hereinabove a novel and useful arrangement for deriving from a memory template data sets each used for uniquely identifying a signature, using data derived from a specimen signature provided by an individual whereby that individual may be identified.

We claim:

1. In a system wherein a memory stores a plurality of sets of data, each set having been derived from a handwritten template signature and which data set uniquely characterizes that signature, and a set of data derived from a handwritten specimen signature is to be compared with one or more of said template signature data sets to determine whether
   the specimen signature was written by one of the persons who wrote the template signatures, a method comprising:
   selecting some of the data from said specimen signature data set,
   establishing a range of acceptable values about the values of said data,
   deriving from said memory those template signature data sets wherein the data which corresponds to said selected data has a value which falls within said range of acceptable values,
   comparing each said derived template data set with said specimen signature data set for determining which template data set provides the optimum comparison result with said specimen signature data set, and
   indicating which of the template data sets provides said optimum comparison result.

2. In a system as recited in claim 1 wherein there is included the step of indicating the identity of the person whose template data set has provided the optimum comparison results.

3. In a system as recited in claim 1 wherein the template and specimen data sets derived from said template signatures are parameter sets, the data set derived from said specimen signature is a parameter set, and the data selected from said specimen parameter set comprises different ones of the parameters.

4. In a system as recited in claim 3 wherein said step of deriving from said memory those template signature parameter sets wherein the parameter which is identical to said selected parameter has a value which falls within said range of acceptable values, includes:
   reading out of said memory all of said template signature parameter sets,
   comparing the range of acceptable values of said selected at least one parameter with the value of the corresponding parameter in each of said template signature parameter sets, and
   passing for subsequent comparisons only those template signature parameter sets wherein the value of said corresponding parameter falls within said range of acceptable values.

5. In a system as recited in claim 3 wherein said different ones of the parameters which are selected are the number of times a pen, used for writing a template or specimen signature, is lifted from the medium on which the signature is taking place during the writing of said signature and the duration of said signature.

6. In a system wherein a memory stores a plurality of sets of data, each set having been derived from a handwritten template signature which data set uniquely characterizes that signature, and a set of data derived from a handwritten specimen signature is to be compared with one or more of said template signature data sets, to determine whether the specimen signature was written by one of the persons who wrote the template signatures, said system comprising:
   means for selecting some of the data from said specimen signature data set,
   means for establishing a range of acceptable values about the values of said selected data,
   means for deriving from said memory those template signature data sets wherein the data which corresponds to said selected data has a value which falls within said range of acceptable values,
   means for comparing each said derived template signature data set with said specimen signature data set, and
   means for indicating the template signature data set which provides the optimum comparison result with said specimen signature data set.

7. In a system as recited in claim 6 wherein there is included means for indicating the identity of the person whose template data set has provided the optimum comparison results.

8. In a system as recited in claim 6 wherein the template and specimen data sets derived from said template signatures are parameter sets, the data set derived from said specimen signature is a parameter set, and the data selected from said specimen parameter set comprises different ones of the parameters.

9. In a system as recited in claim 6 wherein said means for deriving from said memory those template signature parameter sets wherein the parameter which is identical to said selected parameter has a value which falls within said range of acceptable values, includes:
   means for reading out of said memory all of said template signature parameter sets,
   means for comparing the range of acceptable values of said selected parameters with the values of the corresponding parameters in each of said template signature parameter sets, and
   means for passing for subsequent comparison only those template signature parameter sets wherein the value of said corresponding parameters fall within said range of acceptable values.

* * * * *